(12) United States Patent
Zhao et al.

(10) Patent No.: US 12,510,271 B2
(45) Date of Patent: Dec. 30, 2025

(54) HEATING PUMP COVER AND HEATING PUMP

(71) Applicant: BACKER HEATING TECHNOLOGIES (SHENZHEN) CO., LTD., Shenzhen (CN)

(72) Inventors: Kefeng Zhao, Shenzhen (CN); Taiping Zhou, Shenzhen (CN); Xiong Nan, Shenzhen (CN)

(73) Assignee: BACKER HEATING TECHNOLOGIES (SHENZHEN) CO., LTD., Shenzhen (CN)

( * ) Notice: Subject to any disclaimer, the term of this patent is extended or adjusted under 35 U.S.C. 154(b) by 844 days.

(21) Appl. No.: 17/828,852

(22) Filed: May 31, 2022

(65) Prior Publication Data

US 2023/0228454 A1 Jul. 20, 2023

(30) Foreign Application Priority Data

Jan. 20, 2022 (CN) .......................... 202220167127.2

(51) Int. Cl.
*H05B 1/02* (2006.01)
*F24H 1/10* (2022.01)

(52) U.S. Cl.
CPC ........... *F24H 1/101* (2013.01); *H05B 1/0244* (2013.01)

(58) Field of Classification Search
CPC .. H05B 3/10; H05B 1/0283; H05B 2203/017; H05B 3/04; H05B 3/42; H05B 3/48; H05B 3/78

USPC ......................................................... 392/471
See application file for complete search history.

(56) References Cited

U.S. PATENT DOCUMENTS

| 2015/0337859 A1 | 11/2015 | Qi et al. ................ F04D 29/58 |
| 2019/0162204 A1 | 5/2019 | Zoppas et al. .......... F04D 29/58 |

FOREIGN PATENT DOCUMENTS

| CN | 206903949 | 1/2018 | ............. F04D 29/58 |
| CN | 110529392 | 12/2019 | ............. F04D 29/62 |
| CN | 109681473 | 4/2021 | ............. F04D 29/42 |
| CN | 113775529 | 12/2021 | ............. A47L 15/42 |

*Primary Examiner* — Chris Q Liu
(74) *Attorney, Agent, or Firm* — HAYES SOLOWAY P.C.

(57) ABSTRACT

Provides heating pump cover and heating pump, heating pump cover comprises: cover body, comprising flange plate and sealing piece, sealing piece is outside and integrally connected with flange plate, with cross-section stepped, flange plate comprises first surface and second surface arranged oppositely, first surface is for contacting with liquid, temperature control assembly, arranged on second surface, heating body, arranged on one side of first surface, and end of heating body penetrates flange plate, sealing and connecting flange plate, connecting to temperature control assembly by electric circuit. Arranging sealing piece on outer side of flange plate on cover body, with cross-section stepped, after being installed onto pump body, achieving multi-level snapping and sealing, effectively avoiding situation of liquid leakage happen at connecting portion between cover body and pump body due to aging or not tightly sealing, improving sealing performance and reliability of cover body installation.

16 Claims, 6 Drawing Sheets

HEATING PUMP COVER AND HEATING PUMP

RELATED APPLICATIONS

This application claims priority to Chinese Patent Application No. 202220167127.2, filed on Jan. 20, 2022. The content of all of which is incorporate herein by reference.

FIELD OF THE DISCLOSURE

The present disclosure relates to the technical field of a heating pump, and more particularly, to a heating pump cover and a heating pump.

BACKGROUND

With a rapid development of science and technology, an automated household appliance has more functions to assist people's lives, including an automatic dishwasher, a water heater, a drinking fountain and more, which is able to heat up a liquid in a pump body at a same time of driving a water flow through the pump body, so as to provide convenience for people's life.

In the prior art, a heating pump in a household appliance is composed by a pump casing and a pump cover, which are installed together by a plurality of methods including welding, snapping, and more, while a tight sealing and connection shall be ensured. However, with a using time increases by a user, a connection part between the pump cover and a pump body will inevitably have an aging, causing a leakage happen in the connection part, bringing a trouble to the user during production and using.

Therefore, the current technology needs to be improved and developed.

BRIEF SUMMARY OF THE DISCLOSURE

In order to solve a problem in the heating pump in a household appliance in the prior art that, after the connection part between the pump casing and the pump cover is aged, a liquid leakage is likely to occur, causing the user not being able to have a normal usage, the present disclosure provides a heating pump cover and a heating pump.

To achieve the goal stated above, the technical solution of the present disclosure to solve the technical problem is as follows:

A heating pump cover, wherein the heating pump cover comprises:
  A cover body, the cover body comprises a flange plate and a sealing piece, the sealing piece is arranged outside the flange plate and integrally connected with the flange plate, a cross-section of the sealing piece is stepped, the flange plate comprises a first surface and a second surface arranged oppositely, the first surface is applied to contacting with a liquid,
  A temperature control assembly, the temperature control assembly is arranged on the second surface,
  A heating body, the heating body is arranged on one side of the first surface, and an end of the heating body penetrates the flange plate, sealing and connecting with the flange plate, and an end of the heating body connects to the temperature control assembly by an electric circuit.

The heating pump cover, wherein the flange plate has a raised part arranged, the raised part is arranged to protrude from the first surface to the second surface, the end of the heating body corresponds to the raised part, penetrates through before being sealed and arranged in the raised part.

The heating pump cover, wherein the raised part is arranged as one, and at least one of both ends of the heating body penetrates through the raised part, before sealing and connecting with the first surface and the second surface, Or, the raised part is arranged into two, and at least one of both ends of the heating body penetrates through the raised part, before sealing and connecting with the first surface and the second surface.

The heating pump cover, wherein the raised part further has a wrapping portion arranged, and the wrapping portion is arranged extending on the raised part.

The heating pump cover, wherein the sealing piece comprises:
  A first bent portion, the first bent portion is applied to limiting an installation position of the cover body and the pump casing,
  A reinforcing piece, the reinforcing piece is annular, two sides of the reinforcing piece are connected with the flange plate and the first bent part respectively along a preset angle, the reinforcing piece, the flange plate and a cross-section of the first bent portion is arranged in a "Z" shape, while the reinforcing piece, the flange plate and the first bent portion are arranged integrally.

The heating pump cover, wherein the sealing piece further comprises:
  A second bent portion, the second bent portion is arranged outside the first bent portion, and the second bent portion is applied to engaging the pump casing.

The heating pump cover, wherein the sealing piece further has a sealing ring arranged, a size of a cross-section of the sealing ring adapts to a size of a width of the second bent portion, and the sealing ring is sleeved inside the second bent portion.

The heating pump cover, wherein the second bent portion has a plurality of guide pieces arranged along a circumference, and the plurality of guide pieces are spaced by a predetermined distance and arranged at an inclined angle to an outside of the second bent portion.

The heating pump cover, wherein a range of the inclined angle is 1° to 89°.

The heating pump cover, wherein the heating body comprises:
  A heating pipe,
  A first connection end, the first connection end and the heating pipe are smoothly connected along a predetermined angle,
  A second connection end, the second connection end is smoothly connected with the heating pipe along the predetermined angle,
  The first connection end and the second connection end penetrate through the flange plate and connect with the temperature control assembly by a circuit.

The heating pump cover, wherein the heating pipe is a single-layer heating pipe, the heating pipe and the flange plate are arranged at a predetermined distance apart, Or, the heating pipe is a multi-layer heating pipe, the heating pipe and the flange plate are arranged at a predetermined distance apart, and are arranged evenly in a spiral shape.

The heating pump cover, wherein a cross-section of the heating pipe is one of a circle, an ellipse, a trapezoid and a rectangle.

The heating pump cover, wherein the first surface has a water baffle arranged, and the water baffle is arranged continuously along a circumference at an outside or an inside of the heating pipe The heating pump cover, wherein the water baffle has a plurality of water flowing holes arranged, and the plurality of water flowing holes penetrate through the water baffle.

The heating pump cover, wherein the first surface of the flange plate has a heat conducting piece, the heat conducting piece comprises an engaging portion and a connecting portion, the heating body is engaged with the engaging portion, and the connecting portion is overlaid and connecting to the first surface on the flange plate.

The heating pump cover, wherein the temperature control assembly comprises:
  A base board, the base board is overlaid and arranged on the second surface, the base board is a heat conducting base board,
  A temperature controller, a bottom of the temperature controller is overlaid and arranged on the base board,
  A temperature safety device, a bottom of the temperature safety device is overlaid and arranged on the base board,
  A control plug, the control plug is fixedly arranged on the temperature controller and the temperature safety device, both sides of the control plug have a plurality of reinforcing ribs arranged respectively, an end of the heating pipe connects electrically to a first insertion plate and a second insertion plate arranged on both sides of the control plug.

The heating pump cover, wherein the second surface has a plurality of sinking grooves arranged at a position corresponding to the base board, the sinking grooves recess to a side of the first surface on the flange plate, and has a plurality of connecting posts arranged inside, and the base board has a plurality of through holes or notches arranged at a position corresponding to the connecting posts, the connecting posts go through the base board through the through holes, and are fixedly connected with the base board by connecting pieces.

The heating pump cover, wherein the control plug comprises a third insertion plate and a fourth insertion plate, the third insertion plate and the fourth insertion plate are arranged in an interval, the third insertion plate and the fourth insertion plate connect respectively with the temperature controller and the temperature safety device in an electric circuit.

The heating pump cover, wherein the third insertion plate and the fourth insertion plate are arranged in parallel, and a distance between the third insertion plate and the fourth insertion plate is 5 mm±1 mm.

The heating pump cover, wherein the third insertion plate has a first anti-off hole arranged, and the first anti-off hole penetrates through the third insertion plate, The fourth insertion plate has a second anti-off hole arranged, and the second anti-off hole penetrates through the fourth insertion plate.

The heating pump cover, wherein a center of the flange plate has a water inlet arranged, the water inlet has a surrounding edge along a circumference direction arranged, and the surrounding edge is continuously arranged along a circumference of the water inlet.

The heating pump cover, wherein the flange plate has a plurality of grounding terminals arranged, and the grounding terminal has a connecting hole arranged, while the grounding terminals are overlaid and arranged fixedly on the flange plate.

A heating pump, wherein the heating pump comprises the heating pump cover described in any one item stated above.

The heating pump, wherein the heating pump further comprises:
  A pump casing, the pump casing comprises a connection port and a water outlet, the cover body is buckled on the connection port.

The heating pump, wherein the sealing piece comprises:
  A first bent portion,
  A second bent portion, the second bent portion is arranged outside the first bent portion,
  A sealing ring, the sealing ring is detachably sleeved in the second bent portion,
  An outer circumference of the connection port has a mounting portion arranged, an end portion of the connection port is engaged and arranged in the first bent portion, the mounting portion covers and snaps inside the second bent portion, and abuts to one side of the sealing ring.

A beneficial effect of the disclosure is: the heating pump cover of the disclosure is arranging a sealing piece on the outer side of the flange plate on the cover body, and the cross-section of the sealing piece is stepped, and after being installed with the pump body, it is possible to achieve a multi-level snapping and sealing. It can effectively avoid a situation of liquid leakage happen at the connecting portion between the cover body and the pump body due to aging or not tight sealing, and improve a sealing performance and reliability of a cover body installation.

DETAILED DESCRIPTION

To make the objectives, technical schemes and results of the present disclosure more explicit, further description will be made in detail to illustrate the present disclosure. It should be understood that the specific embodiments described herein are only used to explain the present disclosure, and are not intended to limit the scope of the present disclosure.

It should be noted that, if there are a plurality of directional indications (including up, down, left, right, front, back, and more.) involved in the embodiments of the present disclosure, the directional indications are used only to explain, under a certain posture (such as shown in the appendix), a relative positional relationship, a movement situation, and more, between a plurality of various components. If a specific posture changes, the directional indication also changes accordingly.

In addition, if there are a plurality of descriptions involving "first", "second", and more in the embodiments of the present disclosure, the descriptions involving "first", "second", and more, are only for a purpose of description, instead of being understood as indicating or implying a relative importance thereof or implying a number of technical features indicated. Thus, a feature being delimited with "first", "second" may indicate or imply at least one of the features be included. In addition, the technical solutions between various embodiments may be combined with each other, but must be based on the realization by those of ordinary skills in the present art. When a combination of technical solutions is contradictory or cannot be realized, it should be considered that the combination of such a technical solution neither exists, nor within the scope of protection required by the present disclosure.

In the prior art, a heating pump in a household appliance is composed by a pump casing 500 and a pump cover, which are installed together by a plurality of methods including welding, snapping, and more, while a tight sealing and connection shall be ensured. However, with a using time increases by a user, a connecting portion 420 between the pump cover and a pump body will inevitably have an aging, causing a leakage occur in the connecting portion 420, bringing a trouble to the user during production and using.

Figure 1:
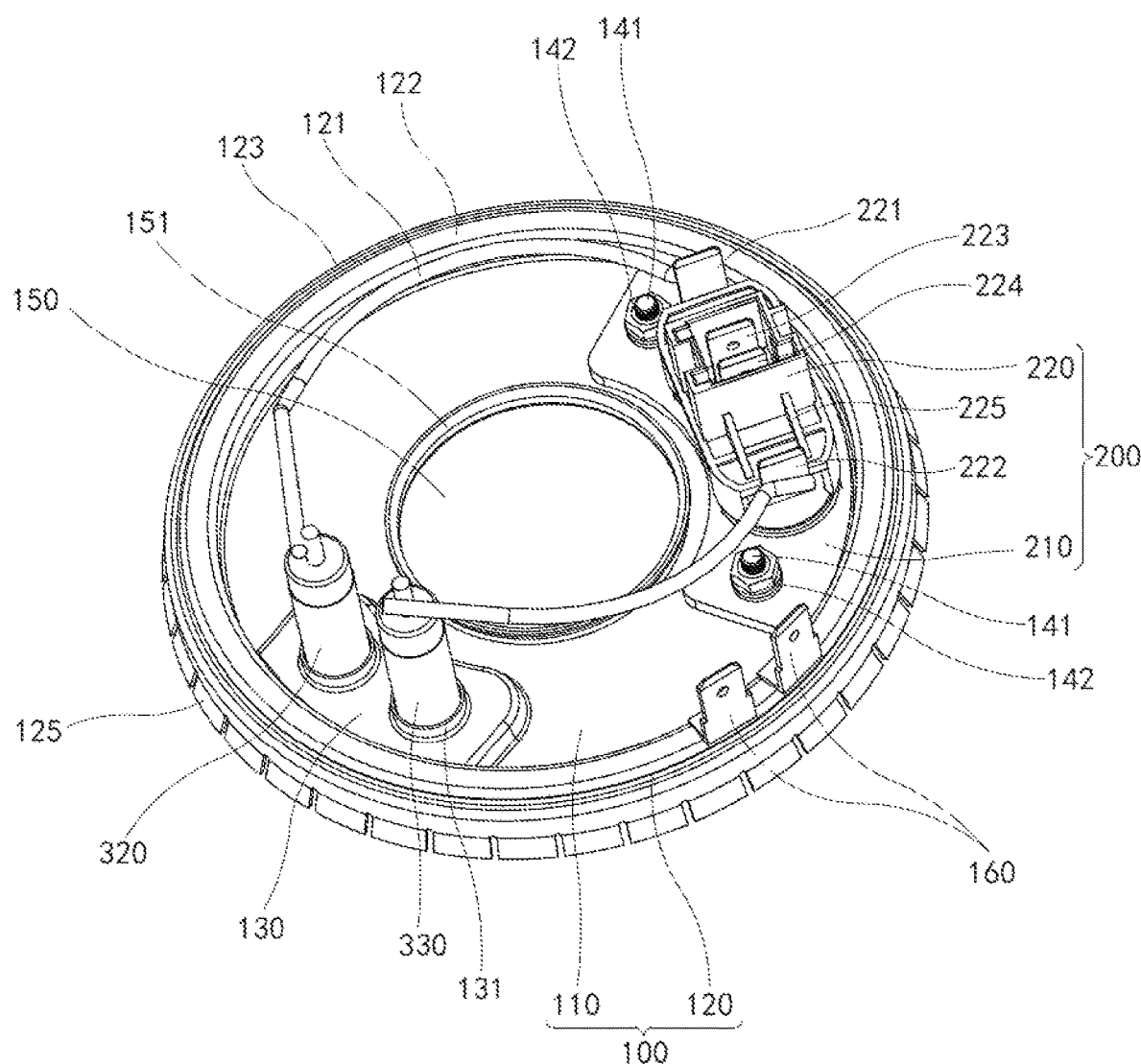
FIG. 1 illustrates a schematic diagram on a three-dimensional structure of a heating pump cover provided by the present disclosure.
Figure 2:
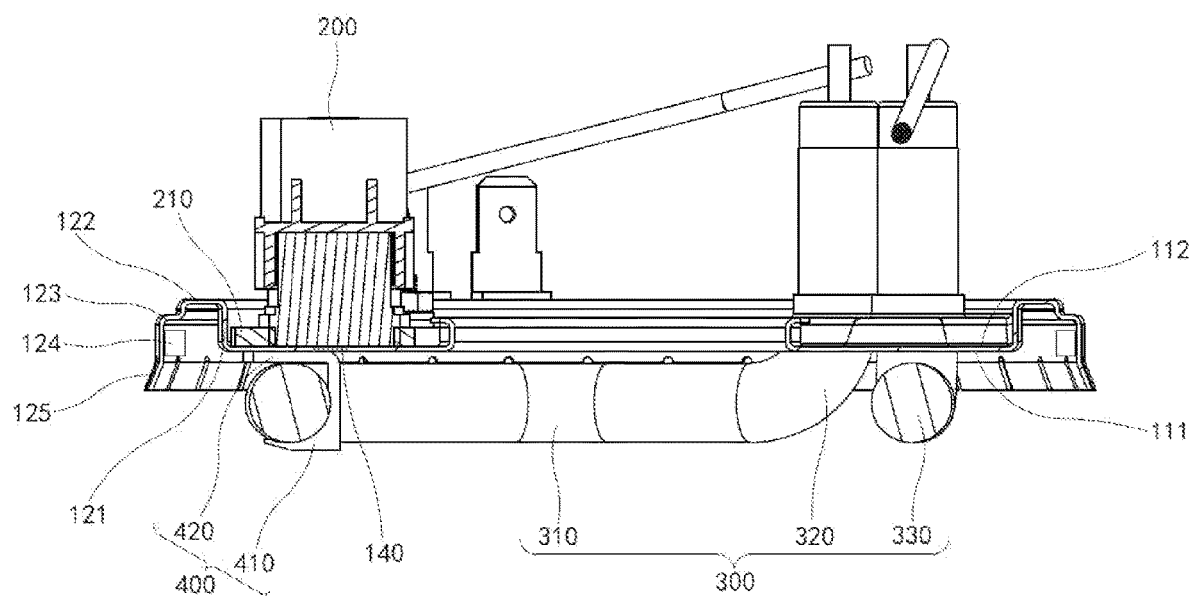
FIG. 2 illustrates a cross-sectional diagram on the heating pump cover provided by the present disclosure.

Based on the problems stated above in the prior art, the present disclosure provides a heating pump cover, shown as FIG. 1 and FIG. 2, the heating pump cover comprises: a cover body 100, the cover body 100 comprises a flange plate 110 and a sealing piece 120, wherein the sealing piece 120 is arranged outside the flange plate 110, and integrally connected with the flange plate 110, a cross-section of the sealing piece 120 is stepped, the flange plate 110 comprises a first surface 111 and a second surface 112 arranged oppositely, the first surface 111 is applied to contacting with a liquid, a temperature control assembly 200, the temperature control assembly 200 is arranged on the second surface 112, a heating body 300, the heating body 300 is arranged on one side of the first surface 111, and an end of the heating body 300 penetrates through and connects with the flange plate 110 in seal, the end of the heating body 300 connects to the temperature control assembly 200 by an electric circuit.

The heating pump cover of the present disclosure arranges a sealing piece 120 on an outer side of the flange plate 110 on the cover body 100. A cross-section of the sealing piece 120 is stepped, and after being arranged with the pump body, it is possible to achieve a multi-level snap-fit sealing, avoiding effectively an occurrence of the liquid leakage due to an aging of the connection part between the cover body 100 and the pump body, and improving a sealing performance of the cover body 100 when being installed.

The embodiments stated above, wherein shown as FIG. 1 and FIG. 2, a main body of the heating pump cover disclosed by the present disclosure is a cover body 100, the cover body 100 comprises a flange plate 110 and a sealing piece 120, wherein the sealing piece 120 is arranged outside of the flange plate 110, and manufactured integrally with the flange plate 110. A shape of the cross-section of the sealing piece 120 is arranged as stepped. In an actual use, the cover body 100 is arranged on the pump body of the heating pump, matching with an opening of the pump body through the sealing piece 120 in a stepped shape, to achieve a multi-level sealing structure. When the cover body 100 ages with time, the sealing piece 120 can still match with the pump body through the multi-level sealing structure, which greatly reduces a damage due to a liquid leakage caused by a looseness of the cover body 100.

For an easy description, in the present embodiment, two sides of the flange plate 110 stated above are named as a first surface 111 and a second surface 112, wherein the first surface 111 corresponds to an inner side of the pump body, applied to contacting with the liquid, the second surface 112 is arranged on an opposite side of the first surface 111, applied to mounting a plurality of other functional structures on the heating pump cover.

The heating pump cover stated above further comprises a temperature control assembly 200, the temperature control assembly 200 is applied to monitoring a temperature of the cover body 100, so as to control the temperature increase when the temperature is insufficient, and lower the temperature or turn off the heating pump cover in time to avoid the heating pump cover from being damaged, when the temperature is too high.

The heating pump cover stated above further comprises a heating body 300, the heating body 300 is applied to heating up the liquid on a side of the first surface 111, an end of the heating body 300 penetrates through and seals with the flange plate 110. The end of the heating body 300, wherein a part passing through the flange plate 110 connects to the temperature control assembly 200 stated above by a circuit, to achieve a power supply through the temperature control assembly 200, and a control to the power supply of the heating body 300, achieving an effect of turning off the heating body 300 automatically by the temperature control assembly 200.

In an actual arrangement, shown as FIG. 1, the flange plate 110 has a raised part 130 arranged, and the raised part 130 is arranged to protrude from the first surface 111 on the flange plate 110 to the second surface 112, and during an actual manufacturing, it is possible to be produced by adopting a pressing method or other methods, so that at a same time of the raised part 130 achieving a convex shape, the raised part 130 maintains an integrity with the flange plate 110. The end of the heating body 300 is arranged correspondingly on the raised part 130, penetrating and being sealed in the raised part 130, that prevents the liquid in the first surface 111 from flowing out of the outside of the flange plate 110 along the end of the heating body 300.

Further, in an embodiment of the present disclosure, shown as FIG. 1, the raised part 130 stated above may be arranged into one, and at least one end of the heating body 300 stated above is arranged as penetrating through the raised part 130 and connecting closely with the first surface 111 and the second surface 112. That is, in the present embodiment, the raised part 130 can be arranged in a relatively large range, and the ends of the heating body 300, wherein one end can penetrate through a position of the raised part 130, or both ends penetrate through the position of the raised part 130 at a same time.

Another embodiment of the present disclosure, wherein the raised part 130 may be arranged into two, at least one end of the ends of the heating body 300 penetrates through the position of the raised part 130, or both ends penetrate through the position of the raised part 130 at a same time.

An advantage of such an arrangement of the present disclosure is, when installing the heating body 300, the end of the heating body 300 requires a certain degree of bending from a main body of the heating body 300, so as to achieve an approximately parallel and corresponding of the main body of the heating body 300 to the cover body 100. In order to ensure that the heating body 300 after being bent will not be damaged, it is necessary to keep a certain size of a folded angle as far as possible at a bent part of the heating body 300. The present disclosure, by arranging the raised part 130 on the flange plate 110, and the raised part 130 can realize an avoidance of the bent part of the end of the heating body 300, makes a position of the heating body 300 and the flange plate 110 more compact after being installed, reducing an installation space, so as to achieve an effect of further reducing an installation space for the heating pump cover in an electrical appliance.

Based on the embodiments stated above, in another embodiment of the present disclosure, shown as FIG. 1, the raised part 130 further has a wrapping portion 131 arranged, while the wrapping portion 131 is arranged extending along the raised part 130, and wrapping the end of the heating body 300, as well as being fixed by a plurality of methods including welding, bonding, and more. An advantage of such an arrangement is increasing a contact area between the raised part 130 and the end of the heating body 300, thereby ensuring the end of the heating body 300, at a same time of penetrating through the raised part 130, keeping a close contact with the raised part 130, and preventing the liquid from flowing out along the end of the heating body 300.

An embodiment of the present disclosure, wherein shown as FIG. 1 and FIG. 2, the sealing piece 120 stated above comprises a first bent portion 122 and a reinforcing piece 121, wherein the first bent portion 122 is arranged in bending. In an actual installation, the first bent portion 122 is applied to limiting an installation position of the pump casing 500, so as to form a cooperation with the pump casing 500. The reinforcing piece 121 is arranged annular, two sides of the reinforcing piece 121 are connected with the flange plate 110 and a first bent angle respectively along a preset angle. In a real implication, the reinforcing piece 121, the flange plate 110 and a cross-section of the first bent portion 122 is connected in a "Z" shape, while a horizontal height of the flange plate 110 in a whole in the cover body 100 is lower than a horizontal height of the first bent portion 122. An advantage of such an arrangement is that, on one hand, an overall structural strength of the cover body 100 can be increased through the reinforcing piece 121, so as to prevent the cover body 100 from being deformed during using, on another hand, the contact area with the pump casing 500 can be increased by the reinforcing piece 121, so that the cover body 100 can be installed more stably.

In another implementation method of the present disclosure, shown as FIG. 1 and FIG. 2, the sealing piece 120 stated above further comprises a second bent portion 123, the second bent portion 123 is arranged outside the first bent portion 122, and closely connected with the first bent portion 122, the second bent portion 123 is applied to snapping with the pump casing 500, and a shape of a cross-section of the first bent portion 122 and the second bent portion 123 is stepped, ensuring that at a same time that the first bent portion 122 is bent to and overlaid on a connection position of the pump casing 500, a further snapping is achieved by the second bent portion 123, before forming a second sealing guarantee.

Based on the embodiments stated above, in another implementation of the present disclosure, shown as FIG. 2, the sealing piece 120 stated above further comprises a sealing ring 124, and the sealing ring 124 is made of a rubber material. In a real arrangement, a cross-sectional size of the sealing ring 124 matches with a width size of the second bent portion 123. In an actual installation, the sealing ring 124 is sleeved on the second bent portion 123, and forming an overlay with an outer surface of the pump casing 500, thus forming another sealing guarantee to the outer side of the pump casing 500, and further avoiding the occurrence of the liquid leakage.

In another implementation method of the present disclosure, shown as FIG. 1 and FIG. 2, the second bent portion 123 has a plurality of guide pieces 125 circumferentially arranged. The plurality of guide pieces 125 are arranged at a predetermined interval and are arranged at an inclined angle toward the outside of the second bent portion 123. An advantage of arranging the guide piece 125 in the present disclosure is facilitating a staff to install the cover body 100. In an electrical appliance, an installation space of the heating pump is relatively compact, thus it is very inconvenient to install the cover body 100. By arranging the guide piece 125, it is possible to guide to a plurality of installation positions of the second bent portion 123 and the first bent portion 122, to facilitate a quick installation by the staff and improve an assembly efficiency. In an actual installation, a range of the inclination angle stated above should be kept in a range of 1° to 89°, that is, it should be an acute angle, so as to ensure a guiding effect while reducing the installation space.

Another implementation of the present disclosure, shown as FIG. 2, wherein the heating body 300 comprises specifically: a heating pipe 310, a first connection end 320 and a second connection end 330, the heating pipe 310, the first connection end 320 and the second connection end 330 are arranged integrally, the first connection end 320 and the heating pipe 310 are smoothly connected along a predetermined angle, the second connection end 330 and the heating pipe 310 are smoothly connected along a predetermined angle, while the first connection end 320 and the second connection end 330 penetrate through the flange plate 110 before forming a match with the raised part 130 arranged on the flange plate 110. A plurality of bending and transition parts of both the first connecting end 320 and the second connecting end 330 are corresponding in the raised part 130, to achieve an effect of the raised part 130 yielding to the first connection end 320 and the second connection end 330, so as to achieve an effect of reducing an installation distance between the heating pipe 310 and the flange plate 110. In an actual installation, a plurality of parts of the first connection end 320 and the second connection end 330 penetrating through the flange plate 110 connect to the temperature control assembly 200 in an electrical circuit, the temperature control assembly 200 is able to perform a circuit control on the heating pipe 310, to realize a plurality of operations including adjusting a heating temperature, shutting down the heating pipe 310 in an emergency, and more.

Based on the embodiments stated above, in an actual arrangement, the heating pipe 310 stated above is a single-layer heating pipe 310, shown as FIG. 2, the heating pipe 310 and the flange plate 110 are arranged at an interval with a predetermined distance, also the heating pipe 310 and the flange plate 110 are arranged approximately in parallel. An advantage of such an arrangement is ensuring a contact area between the heating pipe 310 and the liquid on the first surface 111 of the flange plate 110, thereby ensuring the heating efficiency and preventing the heat of the heating pipe 310 from being transferred directly to the flange plate 110, and causing a situation of heat uneven to happen in the flange plate 110 and the liquid in the pump body.

Figure 4:
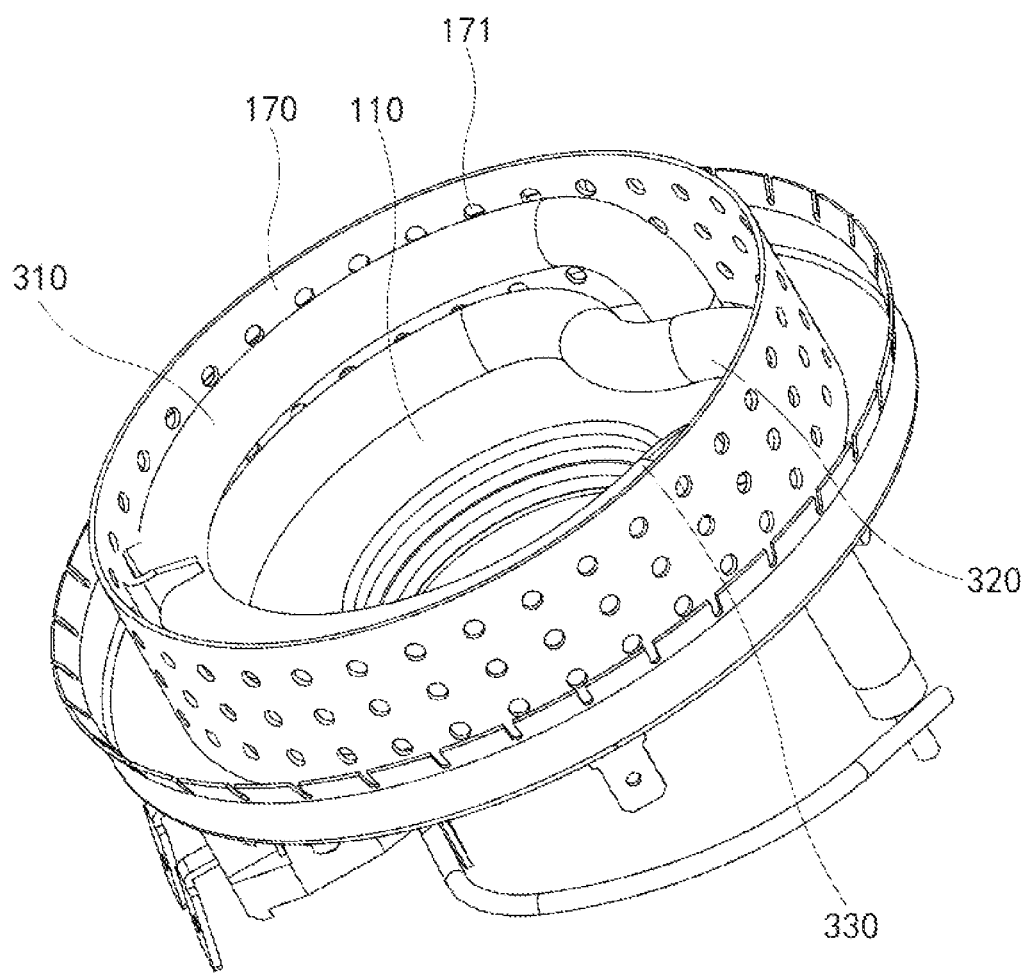
FIG. 4 illustrates a schematic structural diagram on a water-blocking plate in the heating pump cover provided by the present disclosure.

On another hand, as shown in FIG. 4, when a user's requirement is a heating pump cover with a higher heating efficiency, it is possible to replace the heating pipe 310 stated above into a heating pipe 310 having multi-layers, the heating pipe 310 having multi-layers is arranged in a spiral shape, and a plurality of tubes in the heating pipe 310 having multi-layers are separated by a certain distance. Similarly, a side of the heating pipe 310 having multi-layers corresponding to the flange plate 110 and the flange plate 110 are set at an interval having a predetermined distance, to improve a contact area between the liquid and the heating pipe 310.

In the embodiments stated above, the heating pipe 310 can adopt a plurality of types, including the heating pipe 310 in a type having a cross-section in a shape of circle, ellipse, trapezoid, arc and rectangle, so as to satisfy a plurality of requirements when manufacturing the heating pipe 310 in different manufacturing processes.

Based on the embodiments stated above, in an implementation of the present disclosure, as shown in FIG. 2, the first surface 111 of the flange plate 110 has a heat conducting piece 400 further arranged, an arrangement position of the heat conducting piece 400 is corresponding to an arrangement position of the temperature control assembly 200, the heat conducting piece 400 is applied to transferring the heat in a heated liquid on a side of the first surface 111 of the flange plate 110 to the temperature control assembly 200, so that the temperature control assembly 200 is able to perform an exact control to a heating temperature of the heating body 300 to the liquid.

In a real implementation, the heat conducting piece 400 comprises an engaging portion 410 and a connecting portion 420, the engaging portion 410 and the connecting portion 420 are integrally arranged, and are made of a plurality of materials that are good in heat conduction, including aluminum, copper and more. The heating body 300 snaps and connects to the engaging portion 410, the connecting portion 420 is overlaid and connecting to the first surface 111 of the flange plate 110. That is, by the engaging portion 410, it is able to achieve a fixation of one side of the heating pipe 310, while another side of the heating pipe 310 is arranged and fixed on the flange plate 110 by the first connection end 320 and the second connection end 330, so as to achieve a fixation of an installation angle of the heating pipe 310. On another hand, the heat conducting piece 400 is able to conduct a real-time temperature of the heating pipe 310 to the temperature control assembly 200 by contacting the heating pipe 310 and the liquid, so as to achieve an effect of monitoring the temperature of the heating pipe 310, and avoid a situation of the heating pump cover being damaged caused by overheating the heating pipe 310.

In another implementation of the present disclosure, as shown in FIG. 4, a side of the first surface 111 in the flange plate 110 further has a water baffle 170 arranged, the water baffle 170 is applied to protecting the heating pipe 310 and changing a water flow. In an actual arrangement, the water baffle 170 is arranged along a circumference at an outside or an inside of the heating pipe 310, and arranged continuously. The water baffle 170 can achieve an effect of gathering the liquid passing through the cover body 100, so as to ensure a sufficient contact between the liquid and the heating pipe 310. On another hand, under an abnormal condition, such as the heating pipe 310 is dry burning, it is possible to ensure that a periphery of the heating pipe 310 as a whole is heated evenly to avoid a local overheating, causing a plurality of risks including fire.

Further, in order to achieve a full heating to the liquid passing through the cover body 100 and reduce a laminar flow, in the present embodiment, the water baffle 170 further has a plurality of water flowing holes 171 arranged, the plurality of water flowing holes 171 are arranged penetrating through the water baffle 170, and arranged in an array. The liquid after being heated can be dredged along a plurality of positions where the water flowing holes 171 are arranged, thereby a heat exchange effect during the liquid flowing is ensured.

Figure 3:
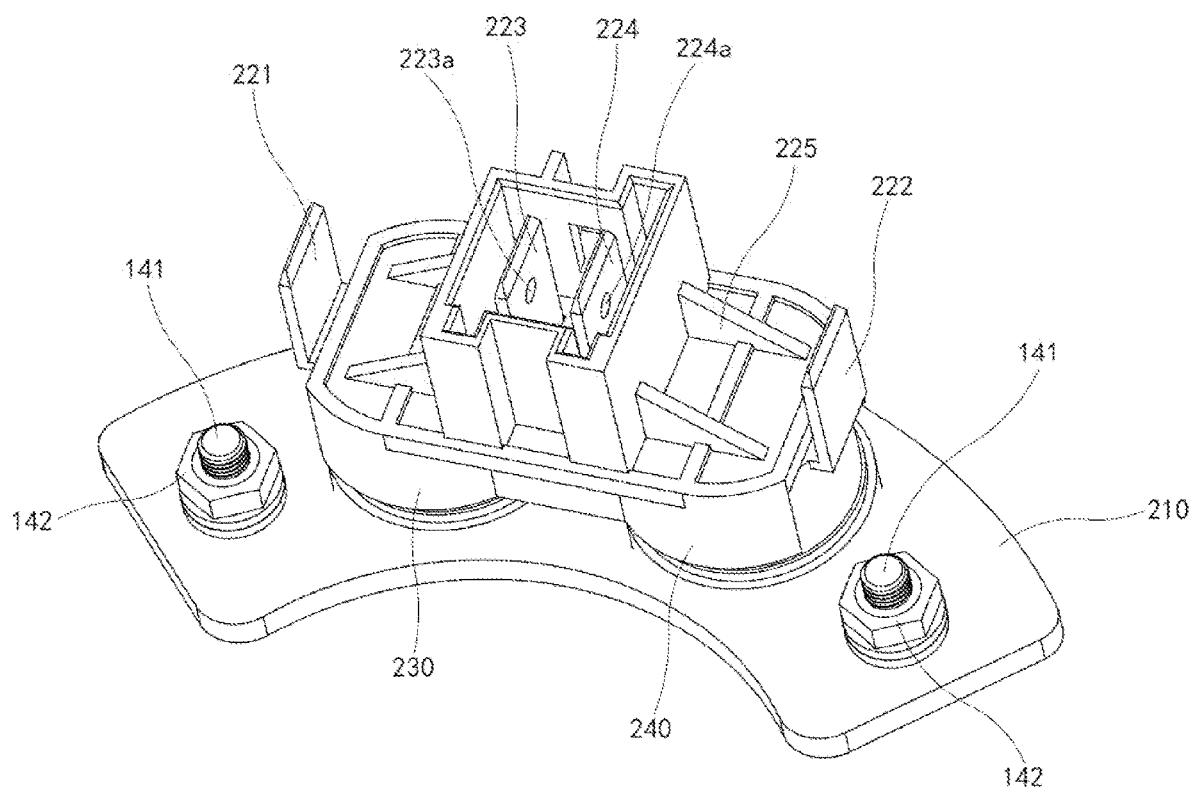
FIG. 3 illustrates a schematic diagram on a three-dimensional structure of a temperature control assembly in the heating pump cover provided by the present disclosure.

In another implementation of the present disclosure, as shown in FIG. 1 and FIG. 3, the temperature control assembly 200 stated above comprises a base board 210, a temperature controller 230, a temperature safety device 240 and a control plug 220, wherein the base board 210 is overlaid and arranged on the second surface 112 of the flange plate 110, and the base board 210 is a heat guiding base board 210. By the base board 210, it is possible to achieve a continuous conduction for the heat conducted by the heat conducting piece 400, conducting to the temperature controller 230 and the temperature safety device 240, to achieve a temperature monitoring, a bottom of the temperature controller 230 is overlaid and arranged on the base board 210. A bottom of the temperature safety device 240 is overlaid and arranged on the base board 210. The temperature safety device 240 may be arranged specifically as a fuse, and more, applied to shutting off a circuit of the heating pipe 310. By the temperature controller 230 and the temperature safety device 240, it is possible to achieve an effect of a real-time control to the temperature of the heating body 300.

The control plug 220 is fixedly arranged on the temperature controller 230 and the temperature safety device 240. In a real arrangement, the control plug 220 may be set by adopting a connector such as a RAST5 and more, to realize an effect of connecting with a power supply. In a specific embodiment, as shown in FIG. 3, it is possible to wrap the temperature controller 230 and the temperature safety device 240 with an outer shell of the control plug 220, to ensure a stability of an installation. In the present embodiment, both sides of the control plug 220 stated above have a plurality of reinforcing ribs 225 arranged. The reinforcing ribs 225 is applied to supporting both sides of the control plug 220, so as to avoid a situation from happening that the control plug 220 is deformed caused by a long term stress concentration. Both sides of the control plug 220 have a first insertion plate 221 and a second insertion plate 222 arranged respectively, the first insertion plate 221 and the second insertion plate 222 connect respectively to the first connection end 320 and the second connection end 330 of the heating body 300 in an electric circuit, and electrically connect respectively to the temperature controller 230 and the temperature safety device 240, so as to achieve an effect of controlling the temperature of the heating body 300 by an electric circuit.

In order to achieve fixing the base board 210 stated above onto the flange plate 110, including the temperature controller 230, the temperature safety device 240 and the control plug 220 on the based board 210, shown as FIG. 2 and FIG. 3, a position on the flange plate 110 corresponding to the base board 210, further has a plurality of sinking grooves 140 arranged, the plurality of sinking grooves recess to a side of the first surface 111, and a side in the sinking groove 140 facing the second surface 112 further has a plurality of connecting posts 141 arranged, and on the base board 210, at a plurality of positions corresponding to the plurality of connecting posts 141, it further has a plurality of through holes or notches arranged. By covering the base board 210 onto the plurality of connecting posts 141 along a direction paralleling to the second surface 112 of the flange plate 110, it is possible to fix a horizontal position of the base board 210. On another hand, the present embodiment further arranges a plurality of connecting pieces 142 adapting to the connecting posts 141 on the connecting posts 141, by combining the connecting pieces 142 and the connecting posts 141, it is possible to achieve an effect of fixing a vertical position of the base board 210. Thus an effect of fixing a relative position of the base board 210 and the flange plate 110 is achieved.

In the embodiments stated above, an advantage of arranging the sink grooves 140 in the present disclosure is that, a root of the connecting post 141 is arranged below the second surface 112 of the flange plate 110, so as to prevent a situation from happening that the root of the connecting post 141 interferes with the base board 210, and causing a situation happen that the base board 210 fits insufficiently with the second surface 112 of the flange plate 110, so as to minimize as possible an occurrence of an inaccurate temperature monitoring to the heating body 300 by the temperature controller 230 and the temperature safety device 240 due to a structural installation problem.

In another implementation of the present disclosure, as shown in FIG. 3, the control plug 220 further comprises a third insertion plate 223 and a fourth insertion plate 224, the third insertion plate 223 and the fourth insertion plate 224 are arranged in an interval, and in parallel. The third insertion plate 223 and the fourth insertion plate 224 connect respectively with the temperature controller 230 and the temperature safety device 240 in an electric circuit. By the third insertion plate 223 and the fourth insertion plate 224, it is possible to achieve a connection with an outer power source, and a plurality of operations including inputting and outputting an electric signal. In a real arrangement, a distance between the third insertion plate 223 and the fourth insertion plate 224 shall be restricted to 5 mm±1 mm, to achieve an effect of matching a matched power plug.

Based on the embodiments stated above, in an implementation of the present disclosure, as shown in FIG. 3, the third insertion plate 223 has a first anti-off hole 223a arranged, and the first anti-off hole 223a penetrates through the third insertion plate 223. By the first anti-off hole 223a, it is possible to achieve a tight connection to the matched power plug, preventing a falling off from occurring, accordingly, the fourth insertion plate 224 also has a second anti-off hole 224a arranged, and the second anti-off hole 224a penetrates through the fourth insertion plate 224. By the second anti-off hole 224a, it is also possible to achieve an anti-off function of matching the power plug and connecting tightly.

In another implementation of the present disclosure, as shown in FIG. 1, a center position of the flange plate 110 stated above has a water inlet 150 arranged, through the water inlet 150, it is possible to pour a liquid into the heating pump, in order to ensure a tight installation for the pipelines connected to the water inlet 150, and prevent the liquid from flowing out along an edge of the water inlet 150, the water inlet 150 has a surrounding edge 151 arranged along a circumference direction, and the surrounding edge 151 is continuously arranged along the circumference of the water inlet 150. By the surrounding edge 151, a contact area between the water inlet 150 and the pipelines connected to the water inlet 150 can be increased, so as to achieve a better blocking effect on the water inlet 150.

In another implementation of the present disclosure, as shown in FIG. 1, the flange plate 110 stated above further has a plurality of grounding terminals 160 arranged, and the grounding terminal 160 has a connecting hole arranged. The grounding terminal 160 is made of a conductive metal material. Through the connection holes on the grounding terminal 160, it is possible to fix the heating pump cover in an electrical appliance, and conducting a current leakage out through the grounding terminal 160, to avoid a short circuit or an electric injury to the user.

Figure 5:
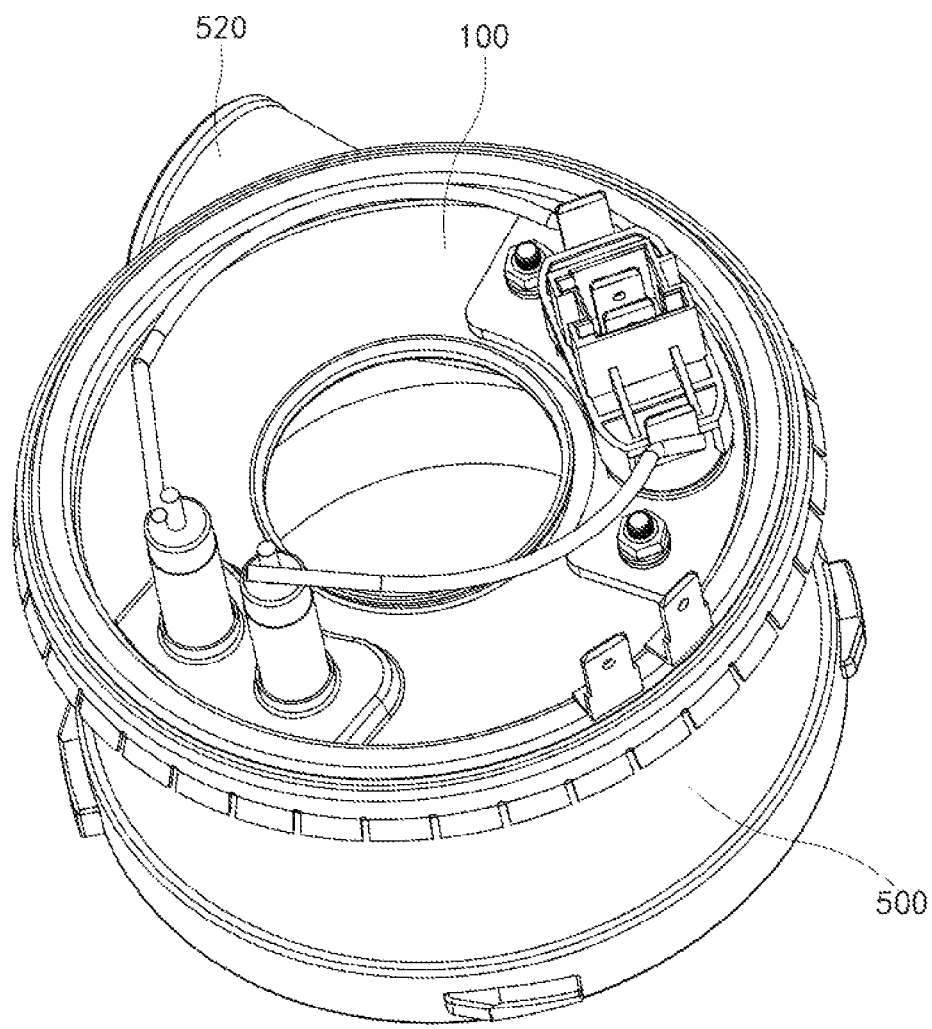
FIG. 5 illustrates a schematic structural diagram on an assembly of the heating pump cover and a pump casing provided by the present disclosure.
Figure 6:
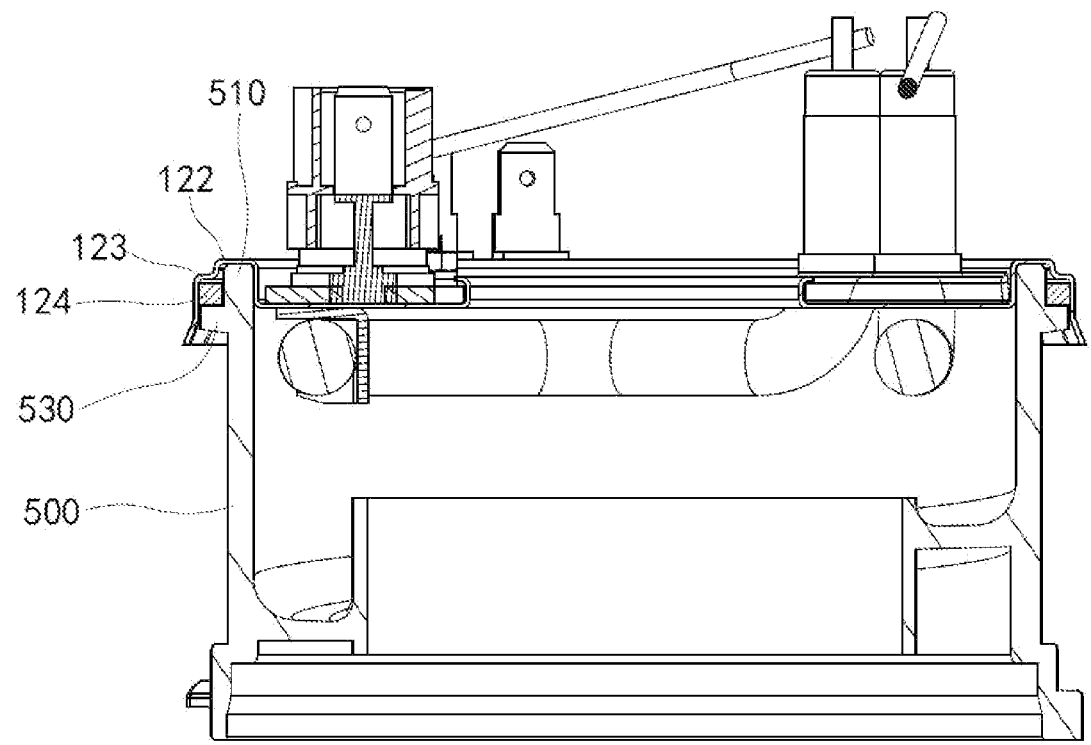
FIG. 6 illustrates a cross-sectional diagram on an assembly of the heating pump cover and a pump casing provided by the present disclosure, Wherein, 100-cover body, 110-flange plate, 111-first surface, 112-second surface, 120-sealing piece, 121-reinforcing piece, 122-first bent portion, 123-second bent portion, 124-sealing ring, 125-guide piece, 130-raised part, 131-wrapping portion, 140-sinking groove, 141-connecting post, 142-connecting piece, 150-water inlet, 151-surrounding edge, 160-grounding terminal, 170-water baffle, 171-water flowing hole, 200-temperature control assembly, 210-base board, 220-control plug, 221-first insertion plate, 222-second insertion plate, 223-third insertion plate, 223a-first anti-off hole, 224-fourth insertion plate, 224a-second anti-off hole, 225-reinforcing rib, 230-temperature controller, 240-temperature safety device, 300-heating body, 310-heating pipe, 320-first connection end, 330-second connection end, 400-heat conducting piece, 410-engaging portion, 420-connecting portion, 500-pump casing, 510-connection port, 520-water outlet, 530-mounting portion.

Based on the embodiments stated above, the present disclosure further provides a heating pump, shown as FIG. 4 and FIG. 5, the heating pump comprises the heating pump cover stated in any one of the embodiments stated above. In addition, the heating pump further comprises a pump casing 500, the pump casing 500 matches to the heating pump cover, and the pump casing 500 further has a connection port 510 and a water outlet 520, the cover body 100 stated above is buckled at the connection port 510 on the pump casing 500, forming an integration of the heating pump. In an actual application, it is possible to input a liquid through the water inlet 150 on the heating pump cover, and heat up the liquid by the heating body 300, before releasing the liquid for use after being heated through the water outlet 520 provided on the pump casing 500.

In the embodiments stated above, shown as FIG. 5, the sealing piece 120 in the cover body 100 comprises a first bent portion 122, a second bent portion 123 and a sealing ring, wherein the first bent portion 122 is arranged on an outside of the flange plate 110, and the second bent portion 123 is arranged outside the first bent portion 122, the sealing ring is sleeved on an inner side of the second bent portion 123, the first bent portion 122 and the second bent portion 123 are closely connected, and a shape of the cross-section is stepped, a size of a diameter of the sealing ring adapts to a size of a width of the second bent portion 123. Accordingly, in the present embodiment, an outer side of the connection port 510 in the pump casing 500 further has a mounting portion 530 arranged circumferentially, and the mounting portion 530 is an annular component, during an actual installation, snapping the end of the connection port 510 into the first bent portion 122, covering and snapping the mounting portion 530 in the second bent portion 123, while an upper side of the sealing ring is limited by the second bent portion 123, and a lower side thereof abuts to an upper surface of the mounting portion 530, while a left side and a right side are attaching respectively to the second bent portion 123 and an outer surface of the pump casing 500, to achieve a fixed position limit.

In the present embodiment, by the first bent portion 122 limiting a position of the end of the connection port 510 in the pump casing 500, a first fence to restrict the liquid from flowing out is formed, and by snapping and fixing a position connecting the second bent portion 123 and the pump casing 500, a second fence to restrict the liquid from flowing out is formed, by fitting the sealing ring to the second bent portion 123 and a surface of the pump casing 500, a third fence to restrict the liquid from flowing out is formed, so as to avoid a situation happen that due to a structural aging of the heating pump, causing a water leakage easily to happen, which greatly reduces a probability of water leakage and damage to the heating pump.

All above, the present disclosure provides a heating pump cover and a heating pump, wherein the heating pump cover comprises: a cover body 100, the cover body 100 comprises a flange plate 110 and a sealing piece 120, the sealing piece 120 is arranged outside the flange plate 110 and integrally connected with the flange plate 110, a cross-section of the sealing piece 120 is stepped, the flange plate 110 comprises a first surface 111 and a second surface 112 arranged oppositely, the first surface 111 is applied to contacting with a liquid, a temperature control assembly 200, the temperature control assembly 200 is arranged on the second surface 112, a heating body 300, the heating body 300 is arranged on one side of the first surface 111, and an end of the heating body 300 penetrates the flange plate 110, before sealing and connecting with the flange plate 110, and an end of the heating body 300 connects to the temperature control assembly 200 by an electric circuit. The heating pump cover of the disclosure is arranging a sealing piece 120 on the outer side of the flange plate 110 on the cover body 100, and the cross-section of the sealing piece 120 is stepped, and after being installed onto the pump body, it is possible to achieve a multi-level snapping and sealing. It can effectively avoid a situation of liquid leakage happen at the connecting portion between the cover body 100 and the pump body due to aging, and improve a sealing performance of a cover body 100 installation.

It should be understood that the application of the present disclosure is not limited to the embodiments stated above. For those of ordinary skills in the present art, a plurality of improvements or transformations can be made according to the descriptions stated above. All these improvements and transformations should belong to the protection of the appended claims of the present disclosure.

What is claimed is:

1. A heating pump cover comprising:
   a cover body, wherein the cover body comprises a flange plate and a sealing piece, wherein the sealing piece is arranged outside the flange plate and is integrally connected with the flange plate, wherein a cross-section of the sealing piece is stepped, wherein the flange plate comprises a first surface and a second surface arranged oppositely, wherein the first surface is applied to contact with a liquid;
   a temperature control assembly, wherein the temperature control assembly is arranged on the second surface, wherein the temperature control assembly comprises:
      a base board, wherein the base board is overlaid and arranged on the second surface, wherein the base board is a heat guiding base board;
      a temperature controller, wherein a bottom of the temperature controller is overlaid and arranged on the base board;
      a temperature safety device, wherein a bottom of the temperature safety device is overlaid and arranged on the base board; and
      a control plug, wherein the control plug is fixedly arranged on the temperature controller and the temperature safety device, wherein two sides of the control plug have a plurality of reinforcing ribs arranged respectively, wherein an end of the heating pipe connects electrically to a first insertion plate and a second insertion plate arranged on both sides of the control plug;
   a heating body, wherein the heating body is arranged on one side of the first surface, and an end of the heating body penetrates the flange plate, sealing and connecting with the flange plate, and an end of the heating body connects to the temperature control assembly by an electric circuit, wherein the heating body comprises:
      a heating pipe;
      a first connection end, wherein the first connection end and the heating pipe are smoothly connected along a predetermined angle; and
      a second connection end, wherein the second connection end is smoothly connected with the heating pipe along the predetermined angle, wherein
      the first connection end and the second connection end penetrate through the flange plate and connect with the temperature control assembly by a circuit,
   wherein the sealing piece has a first bent portion positioned in a parallel arrangement to the flange plate and a second bent portion, wherein the second bent portion is arranged outside the first bent portion; and
   wherein the second surface has a plurality of sinking grooves arranged on the base board, wherein the sinking grooves recess to a side of the first surface on the flange plate, and have a plurality of connecting posts arranged inside, and wherein the base board has a plurality of through holes or notches arranged at a position corresponding to the connecting posts, wherein the connecting posts go through the base board through the through holes, and are fixedly connected with the base board by connecting pieces.

2. The heating pump cover according to claim 1, wherein the flange plate has a raised part arranged to protrude from the first surface to the second surface, wherein the end of the heating body penetrates through raised part to form a seal between the end of the heating body and the raised part.

3. The heating pump cover according to claim 2, wherein the raised part is arranged as one raised part, and at least one of both ends of the heating body penetrates through the raised part, sealing and connecting with the first surface and the second surface,
   or, the raised part is arranged into two raised parts, and at least one of both ends of the heating body penetrates through the raised part, sealing and connecting with the first surface and the second surface.

4. The heating pump cover according to claim 2, wherein the raised part further has a wrapping portion arranged, wherein the wrapping portion is arranged extending on the raised part.

5. The heating pump cover according to claim 1, further comprising
   a reinforcing piece, wherein the reinforcing piece is annular, wherein two sides of the reinforcing piece are connected with the flange plate and the first bent portion respectively along a preset angle, wherein the reinforcing piece, the flange plate and a cross-section of the first bent portion are arranged in a "Z" shape, while the reinforcing piece, the flange plate and the first bent portion are arranged integrally.

6. The heating pump cover according to claim 1, wherein the second bent portion has a plurality of guide pieces arranged along a circumference, and wherein the plurality of guide pieces are spaced by a predetermined distance and arranged at an inclined angle to an outside of the second bent portion.

7. The heating pump cover according to claim 6, wherein a range of the inclined angle is 1° to 89°.

8. The heating pump cover according to claim 1, wherein the heating pipe is a single-layer heating pipe, wherein the heating pipe and the flange plate are arranged at a predetermined distance apart,
   or, the heating pipe is a multi-layer heating pipe, wherein the heating pipe and the flange plate are arranged at a predetermined distance apart, and are arranged evenly in a spiral shape.

9. The heating pump cover according to claim 1, wherein a cross-section of the heating pipe is one of: a circle, an ellipse, a trapezoid or a rectangle.

10. The heating pump cover according to claim 1, wherein the first surface has a water baffle arranged continuously along a circumference at an outside or an inside of the heating pipe.

11. The heating pump cover according to claim 10, wherein the water baffle has a plurality of water flowing holes arranged, and wherein the plurality of water flowing holes penetrate through the water baffle.

12. The heating pump cover according to claim 1, wherein the first surface of the flange plate has a heat conducting piece, wherein the heat conducting piece comprises an engaging portion and a connecting portion, wherein the heating body is engaged with the engaging portion, and wherein the connecting portion connects to the first surface on the flange plate.

13. A heating pump, comprising the heating pump cover according to claim 1.

14. The heating pump according to claim 13, wherein the heating pump further comprises:
   a pump casing, wherein the pump casing comprises a connection port and a water outlet, wherein the cover body is buckled on the connection port.

15. The heating pump according to claim 13, wherein the sealing piece further comprises:
   a sealing ring, wherein the sealing ring is detachably sleeved in the second bent portion, wherein an outer circumference of the connection port has a mounting portion arranged, wherein an end portion of the connection port is engaged and arranged in the first bent portion, wherein the mounting portion is inside the second bent portion, and abuts to one side of the sealing ring.

16. A heating pump cover comprising:
   a cover body, wherein the cover body comprises a flange plate and a sealing piece, wherein the sealing piece is arranged outside the flange plate and is integrally connected with the flange plate, wherein a cross-section of the sealing piece is stepped, wherein the flange plate comprises a first surface and a second surface arranged oppositely, wherein the first surface is applied to contact with a liquid;
   a temperature control assembly, wherein the temperature control assembly is arranged on the second surface, wherein the temperature control assembly comprises:
      a base board, wherein the base board is overlaid and arranged on the second surface, wherein the base board is a heat guiding base board;
      a temperature controller, wherein a bottom of the temperature controller is overlaid and arranged on the base board;
      a temperature safety device, wherein a bottom of the temperature safety device is overlaid and arranged on the base board; and
      a control plug, wherein the control plug is fixedly arranged on the temperature controller and the temperature safety device, wherein two sides of the control plug have a plurality of reinforcing ribs arranged respectively, wherein an end of the heating pipe connects electrically to a first insertion plate and a second insertion plate arranged on both sides of the control plug;
   a heating body, wherein the heating body is arranged on one side of the first surface, and an end of the heating body penetrates the flange plate, sealing and connecting with the flange plate, and an end of the heating body connects to the temperature control assembly by an electric circuit, wherein the heating body comprises:
      a heating pipe;
      a first connection end, wherein the first connection end and the heating pipe are smoothly connected along a predetermined angle; and
      a second connection end, wherein the second connection end is smoothly connected with the heating pipe along the predetermined angle, wherein
      the first connection end and the second connection end penetrate through the flange plate and connect with the temperature control assembly by a circuit,
   wherein the sealing piece has a first bent portion positioned in a parallel arrangement to the flange plate and a second bent portion, wherein the second bent portion is arranged outside the first bent portion,
   wherein the control plug comprises a third insertion plate and a fourth insertion plate, wherein the third insertion plate and the fourth insertion plate are arranged in an interval, wherein the third insertion plate and the fourth insertion plate connect respectively with the temperature controller and the temperature safety device in an electric circuit; and
   the third insertion plate and the fourth insertion plate are arranged parallel to one another, and wherein a distance between the third insertion plate and the fourth insertion plate is 5 mm±1 mm.

* * * * *